(12) United States Patent
Zhou (10) Patent No.: US 11,504,782 B2
(45) Date of Patent: Nov. 22, 2022

(54) RECIPROCATING SAW BLADE MOUNTING DEVICE AND RECIPROCATING SAW

(71) Applicant: Nanjing Chervon Industry Co., Ltd., Nanjing (CN)

(72) Inventor: Yang Zhou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/084,856

(22) Filed: Oct. 30, 2020

(65) Prior Publication Data

US 2021/0046562 A1    Feb. 18, 2021

Related U.S. Application Data

(63) Continuation of application No. PCT/CN2019/078066, filed on Mar. 14, 2019.

(30) Foreign Application Priority Data

May 4, 2018 (CN) .......................... 201810421237.5

(51) Int. Cl.
 *B23D 21/10* (2006.01)
 *B23D 51/10* (2006.01)
(52) U.S. Cl.
 CPC ..................... *B23D 51/10* (2013.01)
(58) Field of Classification Search
 CPC ........ B23D 51/10; B23D 51/08; B23D 49/14; B23D 49/162; B23D 51/00; B23D 49/00;
 (Continued)

(56) References Cited

U.S. PATENT DOCUMENTS 9,156,097 B2 * 10/2015 Neitzell ............... B23D 61/123
10,835,972 B2 * 11/2020 Wyler .................. B23D 49/162
 (Continued)

FOREIGN PATENT DOCUMENTS

CN     1506185 A     6/2004
CN   101612681 A    12/2009
 (Continued)

OTHER PUBLICATIONS

EPO, extended European search report issued on European patent application No. 19797027.0, dated May 26, 2021, 9 pages.
 (Continued)

*Primary Examiner* — Ghassem Alie
(74) *Attorney, Agent, or Firm* — Greenberg Traurig, LLP (57) ABSTRACT

A reciprocating saw blade mounting device includes a reciprocating rod, a clamping mechanism and an ejection mechanism. The reciprocating rod is provided with a clamping cavity. The clamping mechanism includes a clamping member and a positioning member which are disposed opposite to each other. The clamping member can move such that the reciprocating saw blade mounting device switches between a clamping state and a released state. The ejection mechanism includes a pressing block and a first elastic member. When the reciprocating saw blade mounting device is in the released state, the pressing block is elastically pressed between the clamping member and the positioning member by the first elastic member. When the reciprocating saw blade mounting device is in the clamping state, the pressing block is pressed out from between the clamping member and the positioning member by the clamping end and compresses the first elastic member.

19 Claims, 12 Drawing Sheets

(58) Field of Classification Search
CPC ...... B23D 49/007; B23D 49/10; B23D 49/16;
B23D 61/123; B27B 19/00; B27B 19/02;
Y10T 279/17752
USPC .................. 30/392, 394, 523, 339, 371, 293
See application file for complete search history.

(56) References Cited

U.S. PATENT DOCUMENTS

| | | | |
|---|---|---|---|
| 11,065,698 B2* | 7/2021 | Cholst .................... | B23D 51/08 |
| 2002/0017026 A1 | 2/2002 | Kakiuchi et al. | |
| 2006/0266183 A1 | 11/2006 | Guo | |
| 2008/0168666 A1 | 7/2008 | Zhou | |
| 2009/0071016 A1* | 3/2009 | Scott ...................... | B23D 51/10 |
| | | | 30/339 |
| 2010/0000100 A1* | 1/2010 | Saegesser .............. | B23D 51/10 |
| | | | 30/392 |
| 2014/0197609 A1* | 7/2014 | Chen ........................ | B25G 3/18 |
| | | | 279/97 |

FOREIGN PATENT DOCUMENTS

| | | |
|---|---|---|
| CN | 102962516 A | 3/2013 |
| CN | 206356659 U | 7/2017 |
| EP | 2433733 A1 | 3/2012 |
| JP | 2007210098 A | 8/2007 |

OTHER PUBLICATIONS

ISA/CN, Int. Search Report issued on PCT application No. PCT/CN2019/078066, dated Jun. 21, 2019, 6 pages.

* cited by examiner

RECIPROCATING SAW BLADE MOUNTING DEVICE AND RECIPROCATING SAW

RELATED APPLICATION INFORMATION

The present application is a continuation of International Application Number PCT/CN2019/078066, filed on Mar. 14, 2019, through which this application also claims the benefit under 35 U.S.C. § 119(a) of Chinese Patent Application No. CN 201810421237.5 filed on May 4, 2018, which applications are incorporated herein by reference in their entirety.

TECHNICAL FIELD

The present disclosure relates to the technical field of electric tools, in particular, to a reciprocating saw blade mounting device and a reciprocating saw including the reciprocating saw blade mounting device.

BACKGROUND

An electric reciprocating saw is a kind of electric tool used for performing saw cutting through a reciprocating saw blade. The existing reciprocating saw typically includes a reciprocating rod which can perform reciprocating motion and a saw blade connected to the reciprocating rod. The reciprocating rod is driven by a motor to perform the reciprocating motion, and then the saw blade is driven to perform the reciprocating motion, thereby achieving the cutting.

The electric reciprocating saw is used to saw metal plates, pipes, profiles or cut inclined openings on steel pipes, as well as cables or other nonmetallic materials. The saw blade needs to be replaced when worn. Currently, a reciprocating saw blade mounting device has many structures, but most of the devices must be operated with both hands when the saw blade is mounted, which is not convenient for a user.

SUMMARY

In one example of the disclosure, a reciprocating saw blade mounting device comprises a reciprocating rod, a front end of which is provided with a clamping cavity for clamping a clamping end of a saw blade in an axial direction; a clamping mechanism comprising a clamping member and a positioning member which are disposed opposite to each other on the clamping cavity in a radial direction, wherein the clamping member is capable of moving in the radial direction such that the reciprocating saw blade mounting device switches between a clamping state in which the clamping end is clamped in the clamping cavity by the clamping member and a released state in which the clamping end is separated from the clamping cavity; and an ejection mechanism disposed in the clamping cavity, wherein the ejection mechanism comprises a pressing block and a first elastic member; wherein in a case where the reciprocating saw blade mounting device is in the released state, the pressing block is elastically pressed between the clamping member and the positioning member by the first elastic member such that a spacing between the clamping member and the positioning member is greater than or equal to a thickness of the clamping end; and in a case where the reciprocating saw blade mounting device is in the clamping state, the pressing block is pressed out of between the clamping member and the positioning member by the clamping end and compresses the first elastic member.

In one example, two ends of the first elastic member are respectively connected to the pressing block and a cavity bottom of the clamping cavity, the pressing block comprises a limiting portion and a convex portion, and in a case where the reciprocating saw blade mounting device is in the released state, the convex portion is inserted between the clamping member and the positioning member, and the limiting portion abuts a side wall of the clamping member and/or a side wall of the positioning member.

In one example, the pressing block is L-shaped, in a case where the reciprocating saw blade mounting device is in the released state, an inner end of the clamping member is aligned with an inner wall surface of a side wall of the clamping cavity, and the side wall of the positioning member abuts against the limiting portion.

In one example, the ejection mechanism is disposed in the middle of the clamping cavity.

In one example, the clamping mechanism further comprises a rotating sleeve and a torsional spring; the rotating sleeve is rotatably sleeved on the reciprocating rod, the clamping member is a locking pin, the positioning member is a limiting pin, and the locking pin and the limiting pin are disposed to pass through a side wall of the clamping cavity oppositely; an inner wall of the rotating sleeve is provided with an adjusting groove matched with an outer end of the locking pin, the adjusting groove is provided with a clamped position and a released position, the clamped position is closer to an axis of the rotating sleeve than the released position, and the torsional spring provides a force enabling the clamped position to be close to the locking pin.

In one example, the clamping mechanism further comprises a bushing sleeved between the rotating sleeve and the reciprocating rod, and the clamping member and the positioning member respectively pass through the bushing in the radial direction.

In one example, the clamping mechanism further comprises a rear shade sleeved on the reciprocating rod, the rear shade is located at a rear end of the rotating sleeve, at least a part of the torsional spring is accommodated in the rear shade, two legs of the torsional spring are respectively inserted into the clamping cavity and the rotating sleeve, and a limiting structure located at a front end of the rotating sleeve is disposed on the bushing.

In one example, a second elastic member is disposed between the side wall of the clamping cavity and the clamping member, and the second elastic member provides a force enabling the clamping member to move away from the positioning member in the radial direction.

In one example, the ejection mechanism is disposed on a central axis of the clamping cavity.

In one example, the pressing block comprises a limiting portion and a convex portion, the convex portion is capable of being inserted between the clamping member and the positioning member, and the limiting portion abuts a side wall of the clamping member or a side wall of the positioning member when the convex portion is located between the clamping member and the positioning member.

In one example, a reciprocating saw comprises a reciprocating rod provided with a clamping cavity for clamping a saw blade; a clamping mechanism comprising a clamping member and a positioning member which are disposed opposite to each other, wherein the clamping member is capable of moving such that the clamping mechanism switches between a clamping state and a released state; and an ejection mechanism comprising a pressing block and a first elastic member; wherein when the clamping mechanism is in the released state, the pressing block is elastically pressed between the clamping member and the positioning member by the first elastic member; and when the clamping mechanism is in the clamping state, the pressing block is pressed out of between the clamping member and the positioning member and compresses the first elastic member.

In one example, a reciprocating saw comprises a reciprocating rod provided with a clamping cavity for clamping a clamping end of a saw blade in an axial direction; a clamping mechanism comprising a clamping member and a positioning member which are disposed opposite to each other, wherein the clamping member is capable of moving such that the clamping mechanism switches between a clamping state in which the clamping end is clamped in the clamping cavity by the clamping member and a released state in which the clamping end is separated from the clamping cavity; and an ejection mechanism comprising a pressing block and a first elastic member; wherein when the clamping mechanism is in the released state, the pressing block is elastically pressed between the clamping member and the positioning member by the first elastic member; and when the clamping mechanism is in the clamping state, the pressing block is pressed out of between the clamping member and the positioning member and compresses the first elastic member.

In one example, two ends of the first elastic member are respectively connected to the pressing block and a cavity bottom of the clamping cavity, the pressing block comprises a limiting portion and a convex portion, and in a case where the clamping mechanism is in the released state, the convex portion is inserted between the clamping member and the positioning member, and the limiting portion abuts the clamping member or the positioning member.

In one example, the pressing block is L-shaped, when the clamping mechanism is in the released state, an inner end of the clamping member is aligned with an inner wall surface of a side wall of the clamping cavity, and a side wall of the positioning member abuts against the limiting portion.

In one example, the ejection mechanism is disposed in the middle of the clamping cavity.

In one example, the clamping mechanism further comprises a rotating sleeve and a torsional spring; the rotating sleeve is rotatably sleeved on the reciprocating rod, the clamping member is a locking pin, the positioning member is a limiting pin, and the locking pin and the limiting pin are disposed to pass through a side wall of the clamping cavity oppositely; an inner wall of the rotating sleeve is provided with an adjusting groove matched with an outer end of the locking pin, the adjusting groove is provided with a clamped position and a released position, the clamped position is closer to an axis of the rotating sleeve than the released position, and the torsional spring provides a force enabling the clamped position to be close to the locking pin.

In one example, the clamping mechanism further comprises a bushing sleeved between the rotating sleeve and the reciprocating rod, and the clamping member and the positioning member respectively pass through the bushing in a radial direction.

In one example, a second elastic member is disposed between the side wall of the clamping cavity and the clamping member, and the second elastic member provides a force enabling the clamping member to move away from the positioning member in a radial direction.

In one example, a side of an extremity end of the clamping end of the saw blade is provided with a guide portion, gaps exist between two sides of the ejection mechanism for the guide portion to be inserted, and the guide portion can be selectively inserted into the clamping cavity from either of the two sides of the ejection mechanism.

In one example, the ejection mechanism is disposed on a central axis of the clamping cavity.

Beneficial effects of the present disclosure are described below.

Due to the reciprocating saw blade mounting device and the reciprocating saw provided by the present disclosure, when the saw blade is not mounted, the pressing block is clamped between the clamping member and the positioning member and the pressing block makes the spacing between the clamping member and the positioning member greater than or equal to the thickness of the clamping end of the saw blade; and when the saw blade needs to be mounted, the saw blade may be inserted with one hand such that the clamping end abuts against among the clamping member, the positioning member and the pressing block, and then the saw blade is further inserted between the positioning member and the pressing block such that the pressing block is pressed out of between the clamping member and the positioning member. In this way, the saw blade can be mounted with one hand, and the installation is convenient. When the saw blade needs to be disassembled, the clamping cavity releases the clamping of the clamping end, and the pressing block can eject from the clamping cavity under the action of the elastic member, so that the disassembly is very convenient.

DETAILED DESCRIPTION

Solutions of the present disclosure are further described below through specific examples in conjunction with the drawings.

Figure 1:
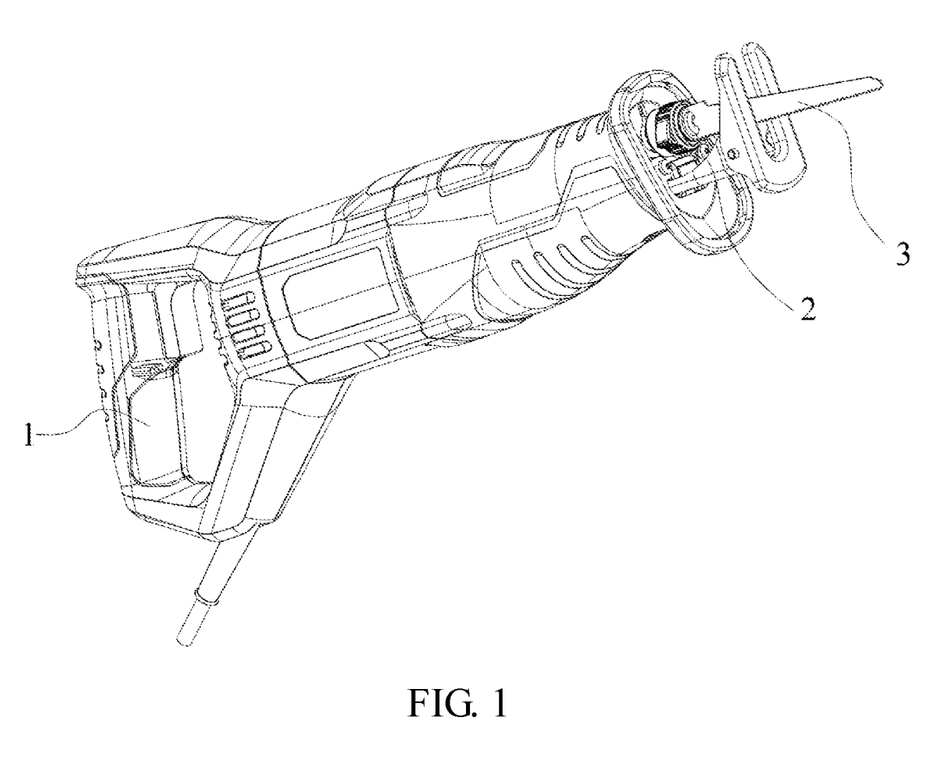
FIG. 1 is a structure view of a reciprocating saw according to an example of the present disclosure.

An example provides a reciprocating saw. As shown in FIG. 1, the reciprocating saw includes a reciprocating saw blade mounting device 2 and a saw blade 3. The saw blade 3 can be clamped or separated from the reciprocating saw blade mounting device 2, and the reciprocating saw blade mounting device 2 is connected to a power mechanism in a reciprocating saw body 1. It is to be noted that the orientation or position relationships indicated by terms "front", "back"," "left", "right" and the like are based on the orientation or position relationships shown in the drawings and should not be construed as limiting the present disclosure. One end close to the reciprocating saw body 1 is a rear end, and one end far away from the reciprocating saw body 1 is a front end.

Figure 2:
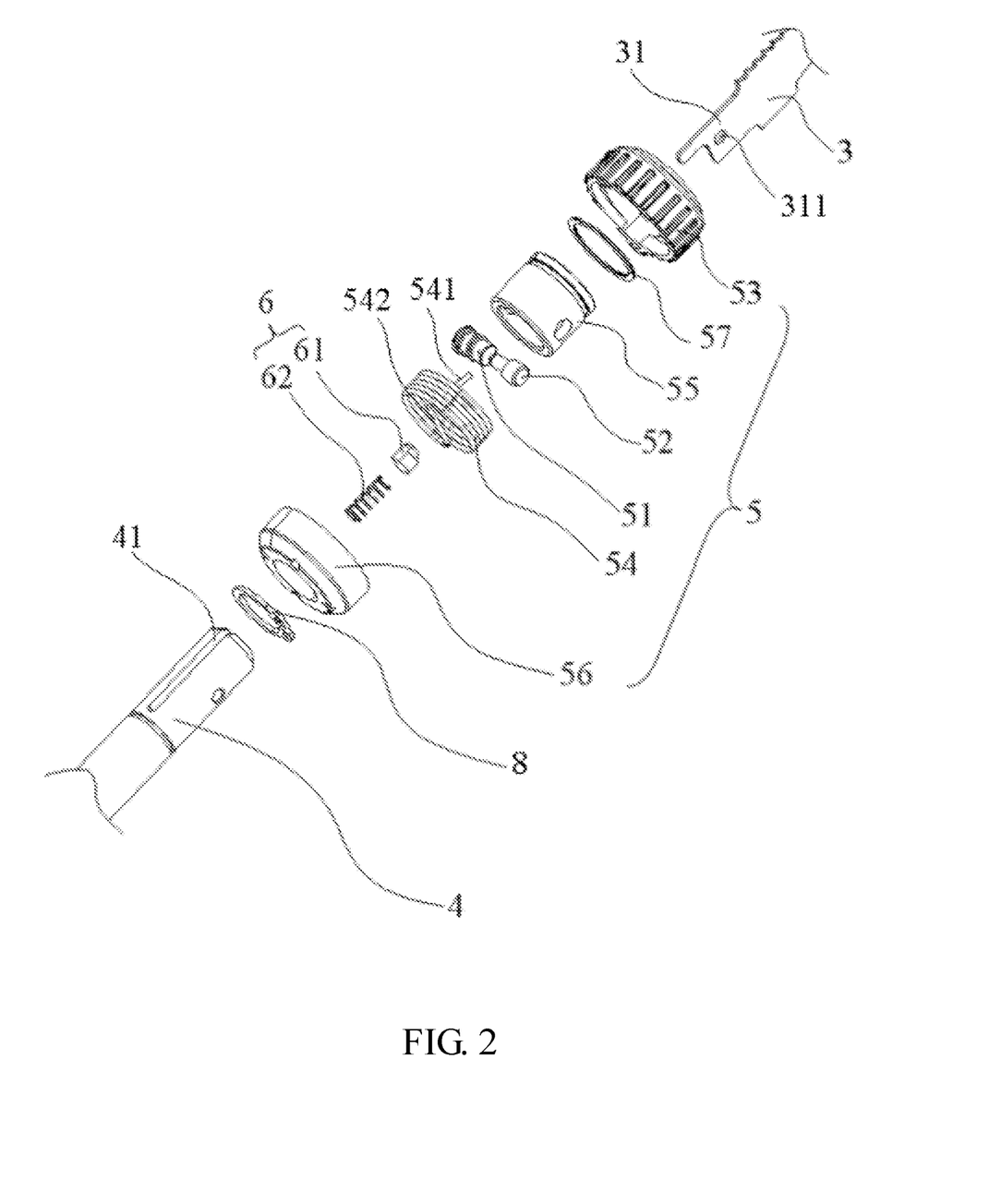
FIG. 2 is an exploded view of a reciprocating saw blade mounting device according to an example of the present disclosure.
Figure 3:
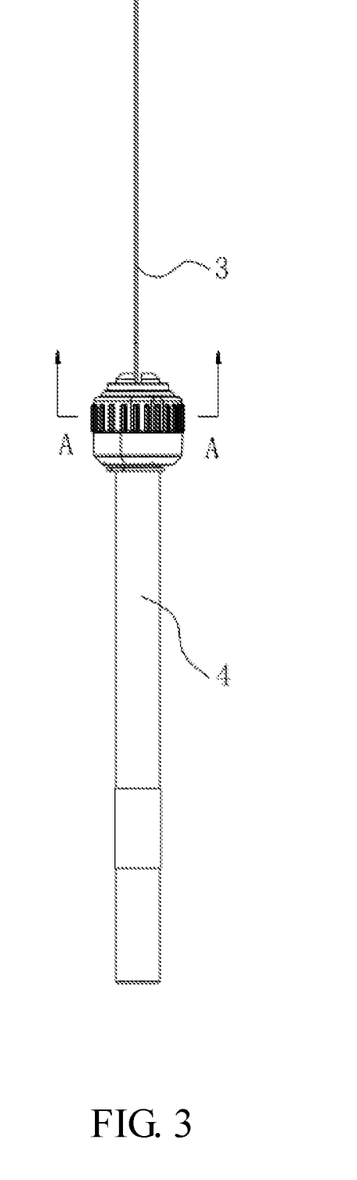
FIG. 3 is a side view of a reciprocating saw blade mounting device in a clamping state according to an example of the present disclosure.
Figure 4:
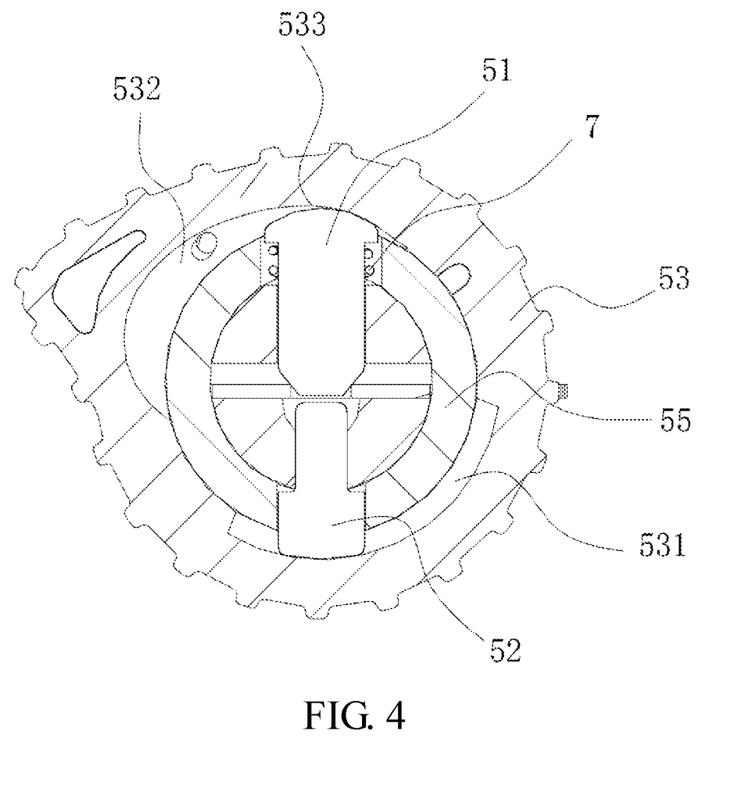
FIG. 4 is a cross-sectional view taken along a line A-A of FIG. 3.
Figure 5:
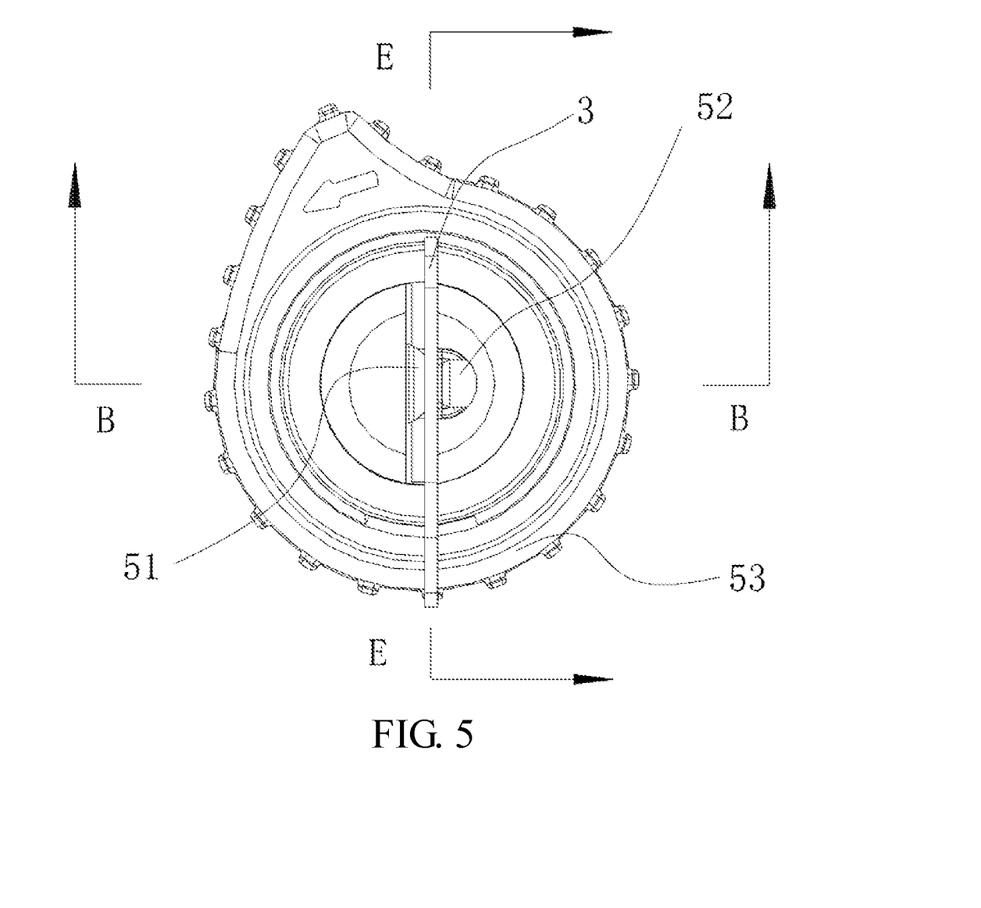
FIG. 5 is a front view of a reciprocating saw blade mounting device in a clamping state according to an example of the present disclosure.

As shown in FIG. 2, a rear end of the saw blade 3 is a clamping end 31, and the reciprocating saw blade mounting device 2 includes a reciprocating rod 4, a clamping mechanism 5 and an ejection mechanism 6. A front end of the reciprocating rod 4 is provided with a clamping cavity 41 in an axial direction, and the clamping cavity 41 is configured to accommodate the clamping end 31. The clamping mechanism 5 is configured to enable the reciprocating saw blade mounting device 2 to switch between a clamping state in which the clamping end 31 is clamped in the clamping cavity 41 shown in FIG. 3 to FIG. 7 and a released state in which the clamping end 31 is separated from the clamping cavity 41 shown in FIG. 8 to FIG. 11. The ejection mechanism 6 can provide an elastic force to enable the clamping end 31 to be separated from the clamping cavity 41, thereby facilitating the disassembly of the saw blade 3.

Specifically, as shown in FIG. 2 to FIG. 6, the clamping mechanism 5 includes a clamping member disposed on the clamping cavity 41 in a radial direction, and the clamping member is preferably a locking pin 51. The locking pin 51 is disposed through a side wall of the clamping cavity 41 in the radial direction, and the locking pin 51 is movable in the radial direction of the clamping cavity 41, such that the reciprocating saw blade mounting device 2 switches between the clamping state in which the clamping end 31 is clamped in the clamping cavity 41 by the locking pin 51 and the released state in which the clamping end 31 is separated from the clamping cavity 41. It could be understood that in other examples, the clamping member may further be replaced with other structures capable of clamping the clamping end 31.

Continue to refer to FIG. 4 to FIG. 11, in this example, the locking pin 51 can be driven to move in the radial direction in the manner described below. The clamping mechanism 5 further includes a positioning member, a rotating sleeve 53 and a torsional spring 54. The positioning member is preferably, but not limited to, a limiting pin 52. The limiting pin 52 and the locking pin 51 are disposed opposite to each other on the side wall of the clamping cavity 41 in the radial direction, i.e., a line connecting the limiting pin 52 to the locking pin 51 is perpendicular to an axis of the reciprocating rod 4. The rotating sleeve 53 is rotatably sleeved on the reciprocating rod 4, and an inner wall of the rotating sleeve 53 is provided with a limiting groove 531 and an adjusting groove 532. An inner wall surface of the limiting groove 531 is matched with an outer end surface of the limiting pin 52, an inner wall surface of the adjusting groove 532 is matched with an outer end surface of the locking pin 51, and the limiting groove 531 is arc-shaped and has a coaxial line with the rotating sleeve 53, i.e., the axes of the limit groove 531 and the sleeve 53 coincide. Referring to FIG. 4 to FIG. 9, the adjusting groove 532 is provided with a clamped position 533, a released position 534 and a smooth curved surface between the clamped position 533 and the released position 534, and the smooth curved surface is preferably an involute curved surface. The clamped position 533 is closer to the axis of the rotating sleeve 53 than the released position 534, and the locking pin 51 can move between the clamped position 533 and the released position 534. In a case where the locking pin 51 is fitted to the clamped position 533, a spacing between the locking pin 51 and the limiting pin 52 is the smallest; and in a case where the locking pin 51 is fitted to the released position 534, the spacing between the locking pin 51 and the limiting pin 52 is the largest. The torsional spring 54 provides a force that brings the clamped position 533 close to the locking pin 51.

Referring to FIG. 2, FIG. 4, FIG. 6, FIG. 7, FIG. 9 and FIG. 11, in order to prevent the limiting pin 52 and the locking pin 51 from swinging up and down, the clamping mechanism 5 further includes a bushing 55 sleeved between the rotating sleeve 53 and the reciprocating rod 4, and the locking pin 51 and the limiting pin 52 are disposed through the bushing 55 in the radial direction such that the bushing 55 is fixedly sleeved on the reciprocating rod 4.

Referring to FIG. 2, FIG. 6, FIG. 7 and FIG. 11, in order to facilitate the installation of the torsional spring 54, the clamping mechanism 5 further includes a rear shade 56 or collar sleeved on the reciprocating rod 4, the rear shade 56 is located at a rear end of the rotating sleeve 53, at least a part of the torsional spring 54 is accommodated in the rear shade 56, and two legs of the torsional spring 54 are respectively inserted into the rotating sleeve 53 and the clamping cavity 41. Specifically, a circumferential direction of the rear shade 56 is provided with an accommodating cavity 561 having an opening at one end, where the accommodating cavity 561 is used for accommodating the torsional spring 54; the torsional spring 54 includes two legs, where a first leg 541 is disposed in an axial direction of the spring body, a second leg 542 is disposed in a direction perpendicular to the axial direction of the spring body, the first leg 541 passes through the opening of the accommodating cavity 561 and is inserted into the rear end of the rotating sleeve 53, and the second leg 542 passes through a side wall of the accommodating cavity 561 and is inserted into the clamping cavity 41. The rear shade 56 may be positioned on the reciprocating rod 4 through a second clamping spring 8 or a shoulder. The rotating sleeve 53 can achieve axial positioning through the rear shade 56 and a limiting structure disposed on the bushing 55 and located at a front end of the rotating sleeve 53. The limiting structure is preferably, but not limited to, a first clamping spring 57, and the first clamping spring 57 may be mounted in a mounting groove provided in the bushing 55.

Continue to refer to FIG. 2, FIG. 6, FIG. 7 and FIG. 11, the ejection mechanism 6 is disposed in the clamping cavity 41 and includes a pressing block 61 and a first elastic member 62. The pressing block 61 is movably connected to the clamping cavity 41 through the first elastic member 62, and the first elastic member 62 is preferably, but not limited to, a spring. A rear end of the spring is fixed to a bottom of the clamping cavity 41, and a front end of the spring is connected to the pressing block 61. In a case where the reciprocating saw blade mounting device 2 is in the released state, the pressing block 61 is elastically pressed between the limiting pin 52 and the locking pin 52 by the first elastic member 62 such that a spacing between the limiting pin 52 and the locking pin 52 is greater than or equal to a thickness of the clamping end 31. In a case where the reciprocating saw blade mounting device 2 is in the clamping state, the pressing block 61 is pressed out of between the limiting pin 52 and the locking pin 52 by the clamping end 31 and compresses the first elastic member 62. With this arrangement mode of the elastic mechanism, when the saw blade 3 needs to be mounted, the saw blade 3 is inserted with one hand such that the clamping end 31 abuts against among the locking pin 51, the limiting pin 52 and the pressing block 61, and then the saw blade 3 is continuously inserted such that the pressing block 61 is pressed out of between the locking pin 51 and the limiting pin 52. In this way, the saw blade 3 can be mounted with one hand, and the installation is convenient. When the saw blade 3 needs to be disassembled, the rotating sleeve 53 is rotated such that the locking pin 51 moves towards the released position 534 of the adjusting groove 532, the locking pin 51 moves outward in the radial direction, the spacing between the locking pin 51 and the limiting pin 52 increases, and the pressing block 61 ejects from the clamping cavity 41 under the action of the first elastic member 62, so that the disassembly is very convenient.

As shown in FIG. 2, in order to prevent the saw blade 3 from loosening after being mounted in place, the clamping end 31 is provided with a locking hole 311, the locking pin 51 is provided with a locking protrusion matched with the locking hole 311, and in a case where the reciprocating saw blade mounting device 2 is in the clamping state, the locking protrusion is fitted into the locking hole 311. It could be understood that positions of the locking hole 311 and the locking protrusion may be interchanged, that is, the above-mentioned locking hole 311 is disposed on the locking pin 51, and the locking protrusion is disposed on the clamping end 31. The above-mentioned locking hole 311 may be arranged as a locking groove.

Figure 6:
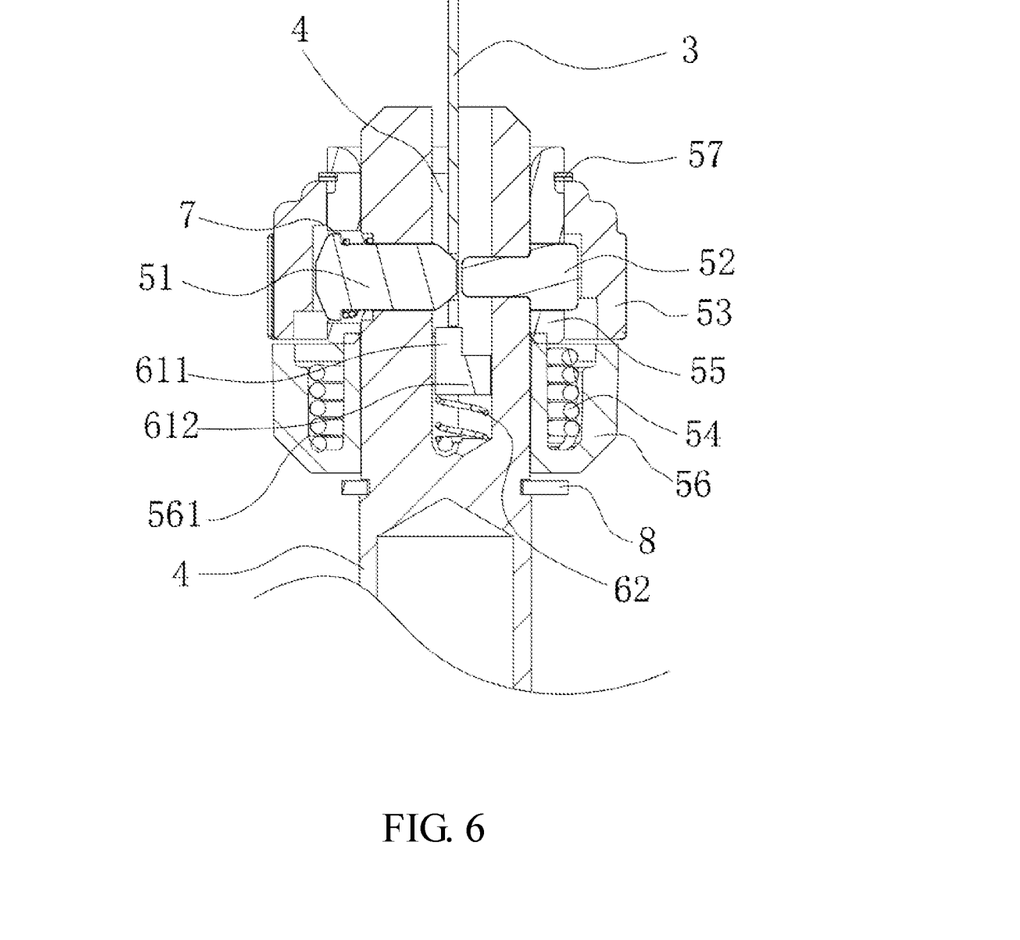
FIG. 6 is a cross-sectional view taken along a line B-B of FIG. 5.
Figure 7:
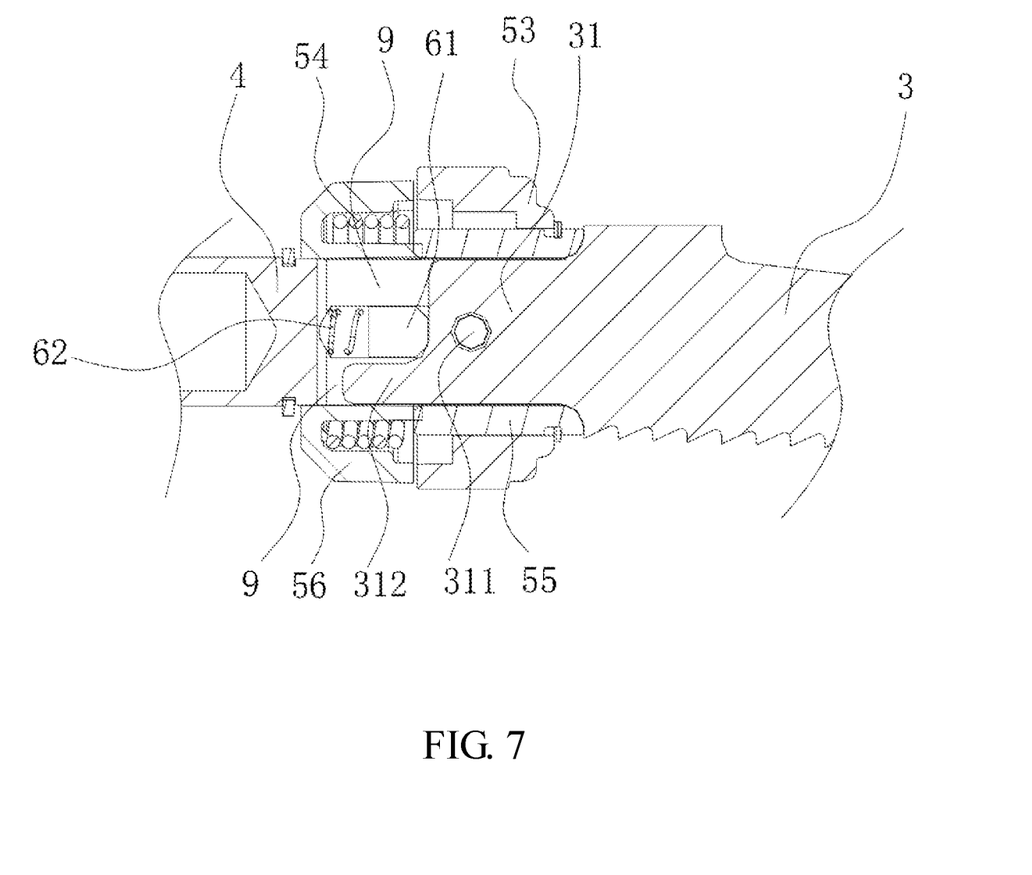
FIG. 7 is a cross-sectional view taken along a line E-E of FIG. 5.
Figure 8:
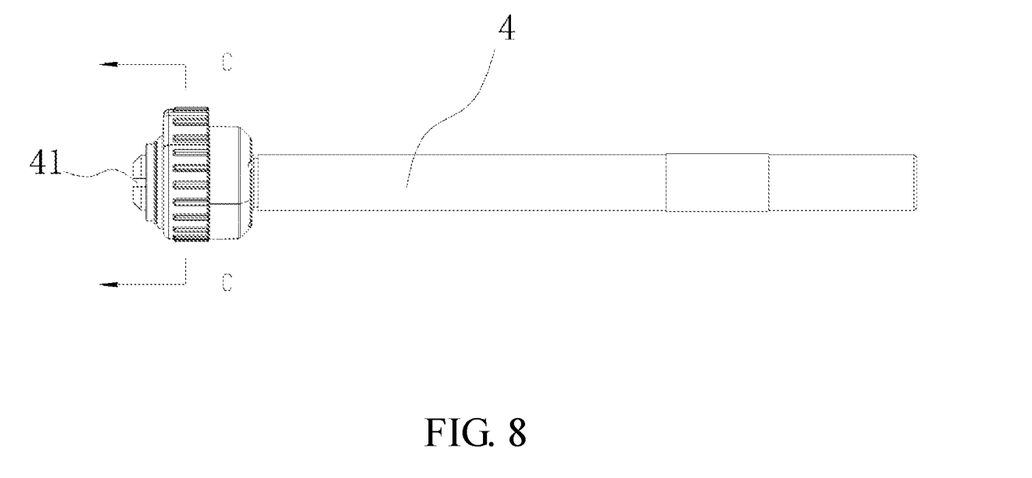
FIG. 8 is a side view of a reciprocating saw blade mounting device in a released state according to an example of the present disclosure.
Figure 9:
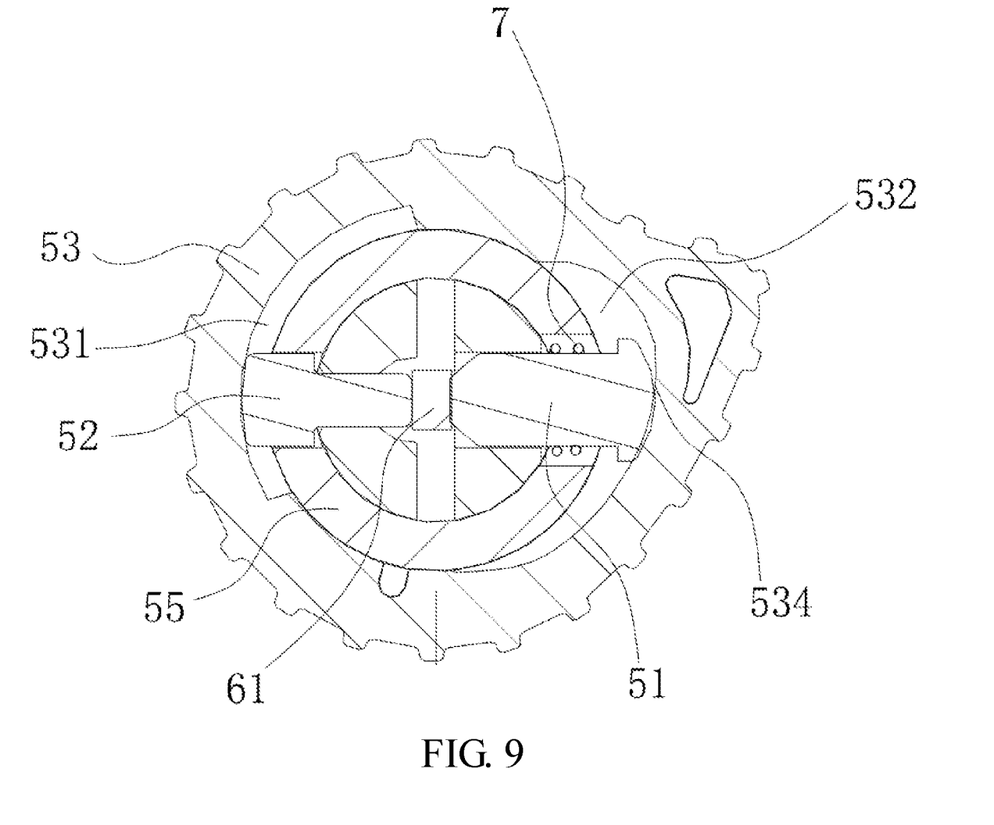
FIG. 9 is a cross-sectional view taken along a line C-C of FIG. 8.
Figure 10:
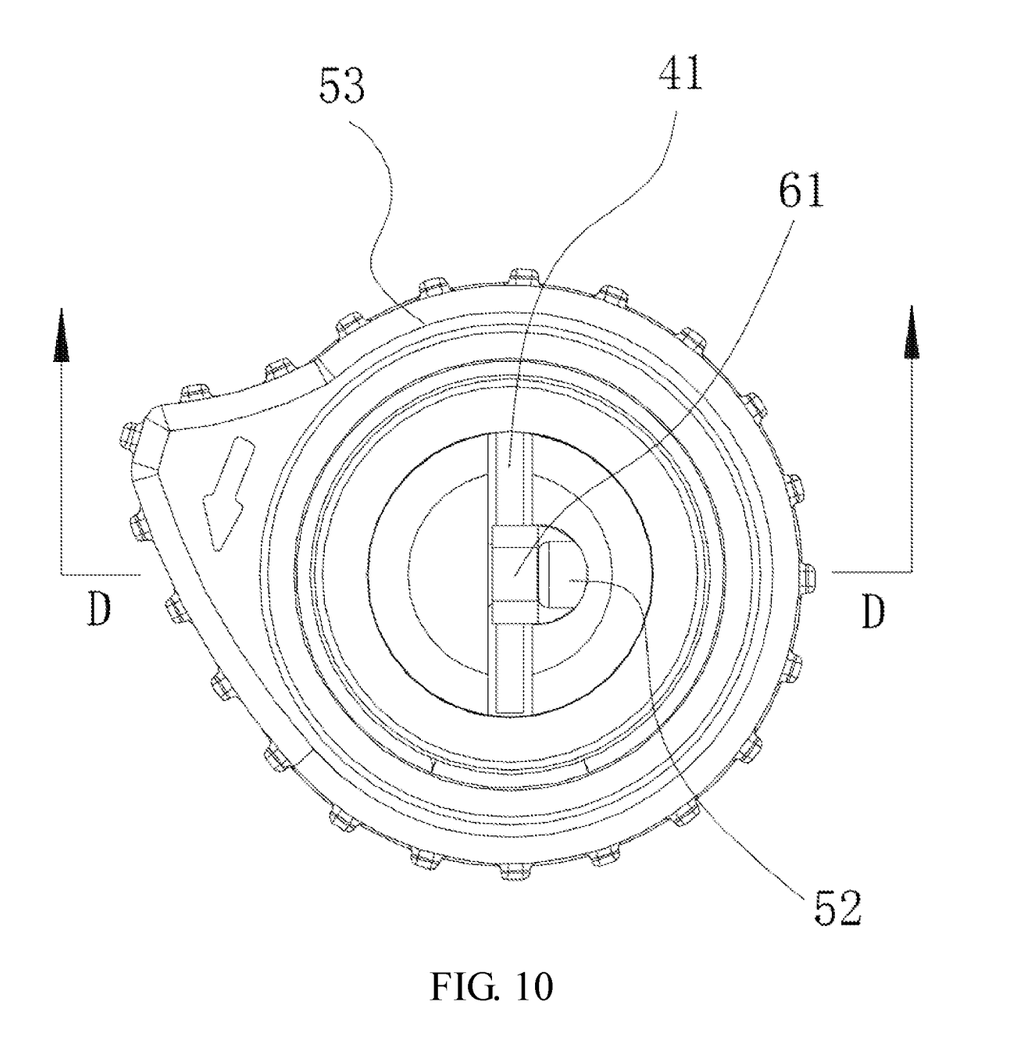
FIG. 10 is a front view of a reciprocating saw blade mounting device in a released state according to an example of the present disclosure.
Figure 11:
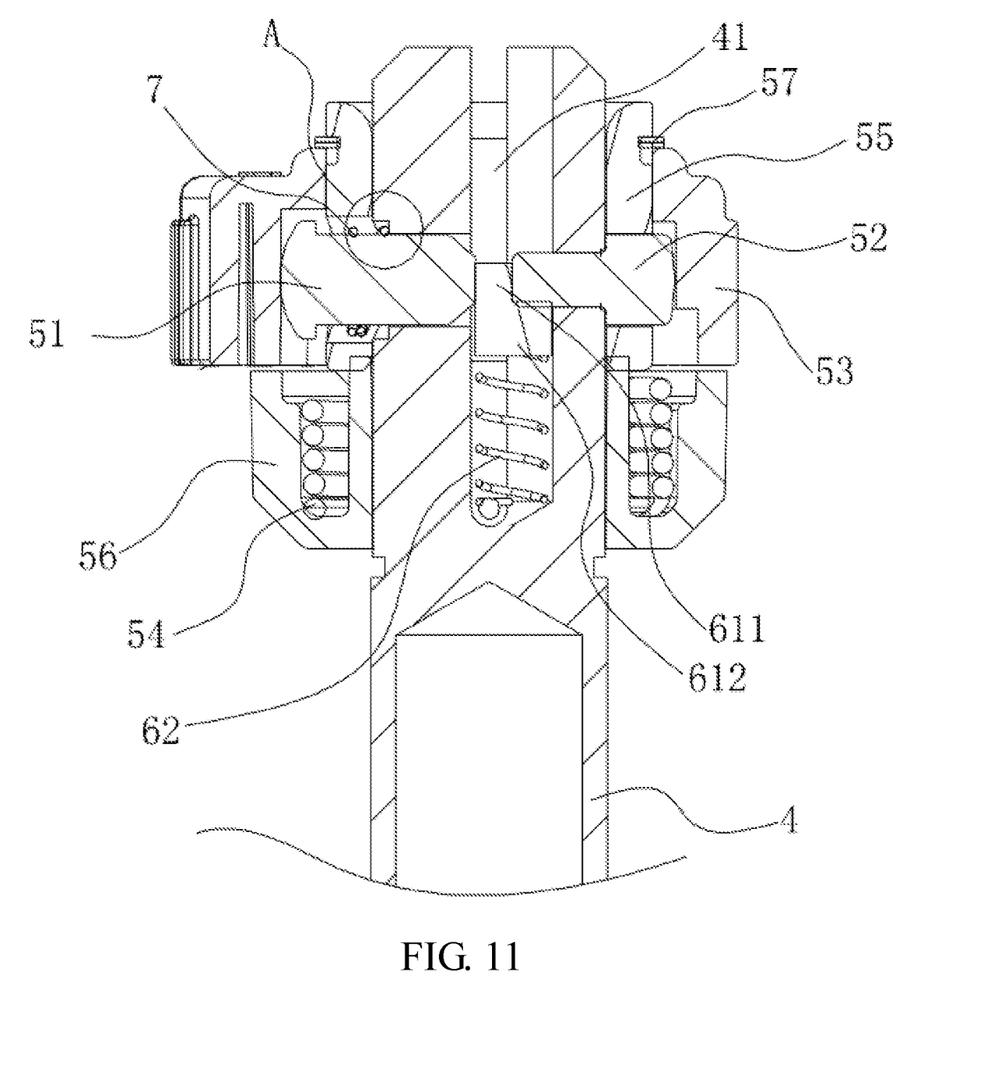
FIG. 11 is a cross-sectional view taken along a line D-D of FIG. 10.

Continue to refer to FIG. 2, FIG. 6 and FIG. 11, in order to prevent the pressing block 61 from being pressed out of between the limiting pin 52 and the locking pin 51 after the saw blade 3 is released, the pressing block 61 includes a limiting portion 612 and a convex portion 611 in a direction away from the first elastic member 62. In a case where the reciprocating saw blade mounting device 2 is in the released state, the convex portion 611 is inserted between the locking pin 51 and the limiting pin 52, and the limiting portion 612 abuts against a side wall of the limiting pin 52. In order to further facilitate the installation of the saw blade 3, the pressing block 61 is L-shaped, that is, one side of the limiting portion 612 is aligned with one side of the convex portion 611, and the other side of the limiting portion 612 protrudes from the convex portion 611. In a case where the reciprocating saw blade mounting device 2 is in the released state, an inner end of the locking pin 51 is aligned with an inner wall surface of the side wall of the clamping cavity 41, and a side wall of the limiting pin 52 abuts against a part of the limiting portion 612 protruding from the convex portion 611. In this arrangement, the saw blade 3 is inserted along one side of the locking pin 51, such that an extremity end of the clamping end 31 can be accurately abutted against the pressing block 61, and thereby the operation can be more accurate. In other examples, in a case where the reciprocating saw blade mounting device 2 is in the released state, the limiting portion 612 may further simultaneously or only abut against a side wall of the locking pin 51.

A side of the extremity end of the clamping end 31 of the saw blade 3 is typically provided with a guide portion 312, and the guide portion 312 is disposed along a length direction of the saw blade 3. When the saw blade 3 is mounted, an outer wall of the guide portion 312 slides substantially along the inner wall surface of the side wall of the clamping cavity 41, so as to play the role of mounting guide. However, in the existing saw blade mounting device, since the ejection mechanism 6 is disposed on one side of the clamping cavity, the guide portion 312 can only be inserted into the clamping cavity from one side. In this example, the ejection mechanism 6 is disposed in the middle of the clamping cavity 41, which refers to that the ejection mechanism 6 may be, but is not limited to being, disposed on a central axis of the clamping cavity 41, or may be offset with respect to the central axis of the clamping cavity 41, so long as gaps 9 exist between two sides of the ejection mechanism 6 and the inner wall surface of the side wall of the clamping cavity 41 for the guide portion 312 to be inserted. Therefore, the guide portion 312 can be selectively inserted into the clamping cavity from either of the two sides of the ejection mechanism 6, thus improving the operating conditions of the saw blade 3.

Figure 12:
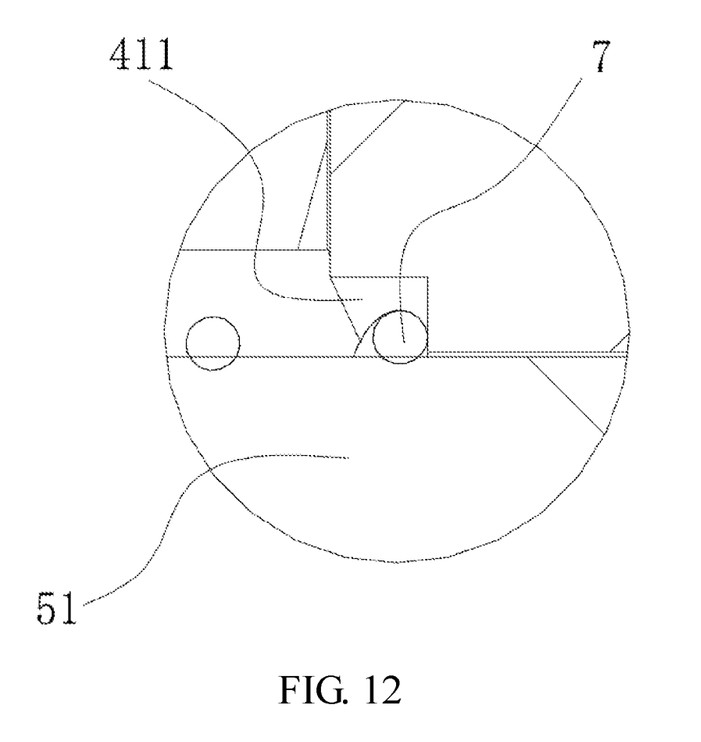
FIG. 12 is a partial enlarged view of a part A of FIG. 11.

In order to save more effort in mounting the saw blade 3, a second elastic member 7 is disposed between the locking pin 51 and the side wall of the clamping cavity 41, and the second elastic member 7 provides a force enabling the locking pin 51 to move away from the limiting pin 52 in the radial direction. Specifically, the second elastic member 7 is disposed between the outer wall surface of the side wall of the clamping cavity 41 and the locking pin 51. As shown in FIG. 12, a positioning groove 411 for accommodating an end of the second elastic member 7 may be disposed on the outer wall surface of the side wall of the clamping cavity 41 to prevent the second elastic member 7 from shaking. The second elastic member 7 is preferably, but is not limited to, a spring.

A method for using the reciprocating saw blade mounting device 2 provided in this example will be briefly described below with reference to FIG. 2 to FIG. 11.

As shown in FIG. 8 to FIG. 11, in a case where the saw blade 3 is not inserted, that is, in a case where the reciprocating saw blade mounting device 2 is in the released state in which the clamping end 31 is separated from the clamping cavity 41, the pressing block 61 abuts against the limiting pin 52 and the locking pin 51 under the action of the first elastic member 62. Specifically, the convex portion 611 of the pressing block 61 is clamped between the limiting pin 52 and the locking pin 51, the limiting portion 612 of the pressing block 61 abuts against the side wall of the limiting pin 52, and the outer end of the locking pin 51 is fitted to the released position 534 of the adjusting groove 532.

In a process that the saw blade 3 is inserted, the saw blade 3 is directly inserted with one hand such that the clamping end 31 abuts against a front end surface of the convex portion 611 of the pressing block 61, then the saw blade 3 is further inserted such that the saw blade 3 pushes the pressing block 61 to move towards the bottom of the clamping cavity 41, and meanwhile the first elastic member 62 is compressed until the locking protrusion is fitted into the locking hole 311. As shown in FIG. 3 to FIG. 7, the installation of the saw blade 3 is completed, the locking pin 51 is fitted into the clamped position 533 of the adjusting groove 532 under the action of the torsional spring 54, and the spacing between the locking pin 51 and the limiting pin 52 is the smallest.

When the saw blade 3 is disassembled, the rotating sleeve 53 is rotated such that the outer end of the locking pin 51 moves towards the released position 534 of the adjusting groove 532, the locking pin 51 moves away from the limiting pin 52, the second elastic member 7 extends, the locking pin 51 exits, and the ejection mechanism 6 ejects the saw blade 3 out of the clamping cavity 41.

The principle of the present disclosure is described above in conjunction with specific examples. The description is merely used for explaining the principle of the present disclosure and is not intended to limit the scope of present disclosure by any means. Based on the explanations herein, other specific examples of the present disclosure conceived by those skilled in the art without creative work are intended to fall within the scope of the present disclosure.

The present disclosure provides a reciprocating saw blade mounting device and a reciprocating saw, a saw blade can be mounted with one hand through the reciprocating saw blade mounting device and the reciprocating saw, so the operation is convenient

What is claimed is:

1. A reciprocating saw blade mounting device, comprising:
 a reciprocating rod having a front end which is provided with a clamping cavity for clamping a clamping end of a saw blade in an axial direction;
 a clamping mechanism comprising a clamping member and a positioning member which are disposed opposite to each other on the clamping cavity in a radial direction, wherein the clamping member is capable of moving in the radial direction such that the reciprocating saw blade mounting device switches between a clamping state in which the clamping end is clamped in the clamping cavity by the clamping member and a released state in which the clamping end is separated from the clamping cavity; and
 an ejection mechanism disposed in the clamping cavity, wherein the ejection mechanism comprises a pressing block and a first elastic member,
 wherein, when the reciprocating saw blade mounting device is in the released state, the pressing block is elastically pressed between the clamping member and the positioning member by the first elastic member such that a spacing between the clamping member and the positioning member is greater than or equal to a thickness of the clamping end and, when the reciprocating saw blade mounting device is in the clamping state, the pressing block is pressed out from between the clamping member and the positioning member by the clamping end and compresses the first elastic member,
 wherein the clamping mechanism further comprises a rear shade sleeved on the reciprocating rod, the rear shade is located at a rear end of a rotating sleeve rotatably sleeved on the reciprocating rod, at least a part of a torsional spring is accommodated in the rear shade, two legs of the torsional spring are respectively inserted into the clamping cavity and the rotating sleeve, and
 wherein two ends of the first elastic member are respectively connected to the pressing block and a cavity bottom of the clamping cavity, the pressing block comprises a limiting portion and a convex portion, and, when the reciprocating saw blade mounting device is in the released state, the convex portion is inserted between the clamping member and the positioning member and the limiting portion abuts at least one of a side wall of the clamping member or a side wall of the positioning member.

2. The reciprocating saw blade mounting device of claim 1, wherein the pressing block is L-shaped and, when the reciprocating saw blade mounting device is in the released state, an inner end of the clamping member is aligned with an inner wall surface of a side wall of the clamping cavity and the side wall of the positioning member abuts against the limiting portion.

3. The reciprocating saw blade mounting device of claim 1, wherein the ejection mechanism is disposed in the middle of the clamping cavity.

4. The reciprocating saw blade mounting device of claim 1, wherein the clamping member is a locking pin, the positioning member is a limiting pin, the locking pin and the limiting pin are disposed to pass through a side wall of the clamping cavity oppositely, an inner wall of the rotating sleeve is provided with an adjusting groove matched with an outer end of the locking pin, the adjusting groove is provided with a clamped position and a released position, the clamped position is closer to an axis of the rotating sleeve than the released position, and the torsional spring provides a force enabling the clamped position to be close to the locking pin.

5. The reciprocating saw blade mounting device of claim 4, wherein the clamping mechanism further comprises a bushing sleeved between the rotating sleeve and the reciprocating rod and the clamping member and the positioning member respectively pass through the bushing in the radial direction.

6. The reciprocating saw blade mounting device of claim 5, wherein a limiting structure located at a front end of the rotating sleeve is disposed on the bushing.

7. The reciprocating saw blade mounting device of claim 4, wherein a second elastic member is disposed between the side wall of the clamping cavity and the clamping member and the second elastic member provides a force enabling the clamping member to move away from the positioning member in the radial direction.

8. The reciprocating saw blade mounting device of claim 1, wherein the ejection mechanism is disposed on a central axis of the clamping cavity.

9. The reciprocating saw blade mounting device of claim 1, wherein limiting portion abuts the side wall of the clamping member or the side wall of the positioning member when the convex portion is located between the clamping member and the positioning member.

10. A reciprocating saw, comprising:
 a reciprocating rod provided with a clamping cavity for clamping a saw blade;
 a clamping mechanism comprising a clamping member and a positioning member which are disposed opposite to each other, wherein the clamping member is capable of moving such that the clamping mechanism switches between a clamping state and a released state; and
 an ejection mechanism comprising a pressing block and a first elastic member,
 wherein, when the clamping mechanism is in the released state, the pressing block is elastically pressed between the clamping member and the positioning member by the first elastic member and, when the clamping mechanism is in the clamping state, the pressing block is pressed out from between the clamping member and the positioning member and compresses the first elastic member,
 wherein the clamping mechanism further comprises a rear shade sleeved on the reciprocating rod, the rear shade is located at a rear end of a rotating sleeve rotatably sleeved on the reciprocating rod, at least a part of a torsional spring is accommodated in the rear shade, two legs of the torsional spring are respectively inserted into the clamping cavity and the rotating sleeve,
 wherein two ends of the first elastic member are respectively connected to the pressing block and a cavity bottom of the clamping cavity, the pressing block comprises a limiting portion and a convex portion, and, when the reciprocating saw is in the released state, the convex portion is inserted between the clamping member and the positioning member and the limiting portion abuts at least one of a side wall of the clamping member or a side wall of the positioning member.

11. A reciprocating saw, comprising:
a reciprocating rod provided with a clamping cavity for clamping a clamping end of a saw blade in an axial direction;
a clamping mechanism comprising a clamping member and a positioning member which are disposed opposite to each other, wherein the clamping member is capable of moving such that the clamping mechanism switches between a clamping state in which the clamping end is clamped in the clamping cavity by the clamping member and a released state in which the clamping end is separated from the clamping cavity; and
an ejection mechanism comprising a pressing block and a first elastic member,
wherein, when the clamping mechanism is in the released state, the pressing block is elastically pressed between the clamping member and the positioning member by the first elastic member and, when the clamping mechanism is in the clamping state, the pressing block is pressed out of between the clamping member and the positioning member and compresses the first elastic member,
wherein the clamping mechanism further comprises a rear shade sleeved on the reciprocating rod, the rear shade is located at a rear end of a rotating sleeve rotatably sleeved on the reciprocating rod, at least a part of a torsional spring is accommodated in the rear shade, two legs of the torsional spring are respectively inserted into the clamping cavity and the rotating sleeve, and
wherein two ends of the first elastic member are respectively connected to the pressing block and a cavity bottom of the clamping cavity, the pressing block comprises a limiting portion and a convex portion, and, when the reciprocating saw is in the released state, the convex portion is inserted between the clamping member and the positioning member and the limiting portion abuts at least one of a side wall of the clamping member or a side wall of the positioning member.

12. The reciprocating saw of claim 11, wherein two ends of the first elastic member are respectively connected to the pressing block and the cavity bottom of the clamping cavity, and, when the clamping mechanism is in the released state, the convex portion is inserted between the clamping member and the positioning member and the limiting portion abuts the clamping member or the positioning member.

13. The reciprocating saw of claim 12, wherein the pressing block is L-shaped and, when the clamping mechanism is in the released state, an inner end of the clamping member is aligned with an inner wall surface of a side wall of the clamping cavity and a side wall of the positioning member abuts against the limiting portion.

14. The reciprocating saw of claim 11, wherein the ejection mechanism is disposed in the middle of the clamping cavity.

15. The reciprocating saw of claim 11, the rotating sleeve is rotatably sleeved on the reciprocating rod, the clamping member is a locking pin, the positioning member is a limiting pin, the locking pin and the limiting pin are disposed to pass through a side wall of the clamping cavity oppositely, an inner wall of the rotating sleeve is provided with an adjusting groove matched with an outer end of the locking pin, the adjusting groove is provided with a clamped position and a released position, the clamped position is closer to an axis of the rotating sleeve than the released position, and the torsional spring provides a force enabling the clamped position to be close to the locking pin.

16. The reciprocating saw of claim 15, wherein the clamping mechanism further comprises a bushing sleeved between the rotating sleeve and the reciprocating rod and the clamping member and the positioning member respectively pass through the bushing in a radial direction.

17. The reciprocating saw of claim 15, wherein a second elastic member is disposed between the side wall of the clamping cavity and the clamping member and the second elastic member provides a force enabling the clamping member to move away from the positioning member in a radial direction.

18. The reciprocating saw of claim 11, wherein a side of an extremity end of the clamping end of the saw blade is provided with a guide portion, gaps exist between two sides of the ejection mechanism for the guide portion to be inserted, and the guide portion can be selectively inserted into the clamping cavity from either of the two sides of the ejection mechanism.

19. The reciprocating saw of claim 11, wherein the ejection mechanism is disposed on a central axis of the clamping cavity.

* * * * *